United States Patent
Takenouchi et al.

[11] Patent Number: 5,818,952
[45] Date of Patent: Oct. 6, 1998

[54] APPARATUS FOR ASSIGNING CATEGORIES TO WORDS IN A DOCUMENTS FOR DATABASES

[75] Inventors: Mariko Takenouchi, Neyagawa; Satoshi Emura, Toyonaka; Saki Takakura, Higashi-Osaka; Ichiro Nakao, Amagasaki, all of Japan

[73] Assignee: Matsushita Electric Industrial Co., Ltd., Osaka, Japan

[21] Appl. No.: 579,550

[22] Filed: Dec. 27, 1995

[30] Foreign Application Priority Data

Dec. 27, 1994 [JP] Japan .................................... 6-325271

[51] Int. Cl.⁶ ...................................................... G06K 9/00
[52] U.S. Cl. .......................... 382/101; 322/177; 322/229; 322/306; 322/309
[58] Field of Search ............................ 382/109, 10, 102, 382/173, 177, 178, 179, 180, 229, 230, 231, 306, 309, 310; 358/403; 395/794, 759, 760

[56] References Cited

U.S. PATENT DOCUMENTS

| | | | |
|---|---|---|---|
| 4,524,453 | 6/1985 | Egami et al. | 382/229 |
| 4,847,912 | 7/1989 | Tanaka et al. | 382/171 |
| 5,050,218 | 9/1991 | Ikeda et al. | 382/101 |
| 5,410,611 | 4/1995 | Huttenlocher et al. | 382/177 |

FOREIGN PATENT DOCUMENTS

| | | |
|---|---|---|
| 63-55624 | 3/1988 | Japan . |
| 63-158678 | 7/1988 | Japan . |

*Primary Examiner*—Phuoc Tran
*Attorney, Agent, or Firm*—Price, Gess & Ubell

[57] ABSTRACT

An apparatus and a method are provided for assigning categories to words in document images. The apparatus and method extract characters and words from document images and assign categories to the words by referring to dictionaries installed in the apparatus. Furthermore, the apparatus and method correct or assign categories by referring to category correction rule dictionary.

26 Claims, 20 Drawing Sheets

Fig. 4

| L1 | recognition candidate | | | L2 | recognition candidate | | | L3 | recognition candidate | | | L4 | recognition candidate | | | L5 | recognition candidate | | |
|---|---|---|---|---|---|---|---|---|---|---|---|---|---|---|---|---|---|---|---|
| | 1 | 2 | 3 | | 1 | 2 | 3 | | 1 | 2 | 3 | | 1 | 2 | 3 | | 1 | 2 | 3 |
| $C_{L1-1}$ | J | j | U | $C_{L2-1}$ | G | O | Q | $C_{L3-1}$ | 2 | Z | Q | $C_{L4-1}$ | N | H | n | $C_{L5-1}$ | ( | 1 | l |
| $C_{L1-2}$ | O | 0 | o | $C_{L2-2}$ | R | B | K | $C_{L3-2}$ | 3 | 8 | s | $C_{L4-2}$ | E | B | F | $C_{L5-2}$ | 1 | l | i |
| $C_{L1-3}$ | H | h | K | $C_{L2-3}$ | O | 0 | o | $C_{L3-3}$ | 4 | A | d | $C_{L4-3}$ | W | w | N | $C_{L5-3}$ | 2 | Q | 9 |
| $C_{L1-4}$ | M | N | H | $C_{L2-4}$ | U | V | v | $C_{L3-4}$ | A | 4 | L | $C_{L4-4}$ | V | Y | y | $C_{L5-4}$ | 3 | 8 | S |
| $C_{L1-5}$ | G | C | 6 | $C_{L2-5}$ | P | F | p | $C_{L3-5}$ | B | 8 | E | $C_{L4-5}$ | O | 0 | o | $C_{L5-5}$ | ) | J | y |
| $C_{L1-6}$ | R | P | B | $C_{L2-6}$ | M | N | m | $C_{L3-6}$ | C | G | o | $C_{L4-6}$ | R | P | B | $C_{L5-6}$ | 4 | A | d |
| $C_{L1-7}$ | E | B | 5 | $C_{L2-7}$ | A | 4 | L | $C_{L3-7}$ | R | B | K | $C_{L4-7}$ | K | X | k | $C_{L5-7}$ | s | 5 | 6 |
| $C_{L1-8}$ | E | B | F | $C_{L2-8}$ | N | M | H | $C_{L3-8}$ | O | 0 | o | $C_{L4-8}$ | , | . | g | $C_{L5-8}$ | 6 | G | 5 |
| $C_{L1-9}$ | N | M | H | $C_{L2-9}$ | A | 4 | L | $C_{L3-9}$ | A | 4 | L | $C_{L4-9}$ | N | H | n | $C_{L5-9}$ | — | · | . |
| | | | | $C_{L2-10}$ | G | O | Q | $C_{L3-10}$ | D | b | O | $C_{L4-10}$ | . | — | . | $C_{L5-10}$ | 7 | T | V |
| | | | | $C_{L2-11}$ | E | 5 | F | | | | | $C_{L4-11}$ | Y | V | y | $C_{L5-11}$ | 8 | S | 6 |
| | | | | $C_{L2-12}$ | R | B | K | | | | | $C_{L4-12}$ | . | — | · | $C_{L5-12}$ | 9 | g | 3 |
| | | | | | | | | | | | | $C_{L4-13}$ | 1 | l | i | $C_{L5-13}$ | 0 | O | o |
| | | | | | | | | | | | | $C_{L4-14}$ | 0 | O | o | | | | |
| | | | | | | | | | | | | $C_{L4-15}$ | 0 | O | o | | | | |
| | | | | | | | | | | | | $C_{L4-16}$ | 3 | 8 | s | | | | |
| | | | | | | | | | | | | $C_{L4-17}$ | 8 | 3 | s | | | | |

Fig. 5

| L4 | start coordinates | | end coordinates | | height | distance between characters |
|---|---|---|---|---|---|---|
| | Xs | Ys | Xe | Ye | H | D |
| $C_{L4-1}$ | 19 | 76 | 25 | 83 | 7 | 2 |
| $C_{L4-2}$ | 27 | 76 | 33 | 83 | 7 | 1 |
| $C_{L4-3}$ | 34 | 76 | 42 | 83 | 7 | 5 |
| $C_{L4-4}$ | 47 | 76 | 53 | 83 | 7 | 2 |
| $C_{L4-5}$ | 55 | 76 | 61 | 83 | 7 | 2 |
| $C_{L4-6}$ | 63 | 76 | 69 | 83 | 7 | 2 |
| $C_{L4-7}$ | 71 | 76 | 77 | 83 | 7 | 1 |
| $C_{L4-8}$ | 78 | 81 | 80 | 84 | 3 | 3 |
| $C_{L4-9}$ | 83 | 76 | 89 | 83 | 7 | 1 |
| $C_{L4-10}$ | 90 | 81 | 92 | 84 | 3 | 3 |
| $C_{L4-11}$ | 95 | 76 | 101 | 83 | 7 | 1 |
| $C_{L4-12}$ | 102 | 81 | 104 | 84 | 3 | 5 |
| $C_{L4-13}$ | 109 | 75 | 113 | 84 | 9 | 3 |
| $C_{L4-14}$ | 116 | 75 | 122 | 84 | 9 | 2 |
| $C_{L4-15}$ | 124 | 75 | 130 | 84 | 9 | 2 |
| $C_{L4-16}$ | 132 | 75 | 138 | 84 | 9 | 2 |
| $C_{L4-17}$ | 140 | 75 | 146 | 84 | 9 | — |

Fig. 8

(a) [keyword-except-addresses-and-names dictionary]  6

| category | keyword |
|---|---|
| "COMPANY" | co,company,inc,⋯ |
| "SECTION" | branch,group,section,⋯ |
| "TITLE" | administrator,captain,manager,⋯ |
| "STREET" | ave,aveneu,road,⋯ |
| "TEL" | tel,telephone,⋯ |

(b) [name dictionary]

| | number of characters | word |
|---|---|---|
| "FIRST NAME" | 1 | j,m,⋯,t "frequency α" p,⋯ |
| | 2 | "frequency α" jo,⋯ |
| | 3 | ann "frequency α" joe,⋯ |
| | 4 | john,mary,⋯,jean "frequency α" rose,⋯ |
| | ⋮ | ⋮ |

| | number of characters | word |
|---|---|---|
| "LAST NAME" | 2 | "frequency β" ng,⋯ |
| | 3 | lee,kim "frequency β" cox,⋯ |
| | 4 | hill,king,⋯,sims "frequency β" boyd,⋯ |
| | 5 | smith,brown,⋯,price "frequency β" owens,⋯ |
| | ⋮ | ⋮ |

[address dictionary]

| "STATE" | number of characters | "CITY" |
|---|---|---|
| al alabama | 4 | abel,alma,arab,⋯ |
| | 5 | aomar,adger,akron,⋯ |
| | 6 | almond,alpine,arlton,⋯ |
| | ⋮ | ⋮ |
| ak alaska | 4 | anch,atka,elim,⋯ |
| | ⋮ | ⋮ |

(c) [category-word-except-addresses-and-names dictionary]  7

| category | word |
|---|---|
| "COMPANY" | abc,b&c,cosmos,⋯ |

Fig. 9

| word | matched keyword | corrected item |
|---|---|---|
| W1 | "FIRSTNAME" | "FIRSTNAME" |
| W2 | "LASTNAME" | "LASTNAME" |
| W3 | "SECTION" | "TITLE" |
| W4 | "TITLE" | "TITLE" |
| W5 | "" | "STREET" |
| W6 | "" | "STREET" |
| W7 | "STREET" | "STREET" |
| W8 | "" | "CITY" |
| W9 | "" | "CITY" |
| W10 | "STATE" | "STATE" |
| W11 | "" | "ZIP" |
| W12 | "" | "TEL" |
| W13 | "" | "TEL" |
| W14 | "" | "TEL" |

Fig. 10

| category | recognition result |
|---|---|
| "NAME" | JONH GREEN |
| "STREET" | 2 3 4  A B C  R O A D |
| "CITY" | N E W  Y O R K |
| "STATE" | N Y |
| "ZIP" | 1 0 0 3 8 |
| "TEL" | ( 1 2 3 )  4 5 6 - 7 8 9 0 |
| "COMPANY" | |
| "SECTION" | |
| "TITLE" | G R O U P  M A N A G E R |
| "OTHERS" | |

APPARATUS FOR ASSIGNING CATEGORIES TO WORDS IN A DOCUMENTS FOR DATABASES

BACKGROUND OF THE INVENTION (1) Field of the Invention

This invention relates to an apparatus for optically reading documents like business cards, classifying words which are contents of the documents into categories such as name, company, job title, address, etc., and storing them into databases.

(2) Description of the Prior Art

Recently, there has been a demand for automatically storing data in a large number of business cards, letters, postcards, and literature lists into databases. Currently, card readers using Cypher Scan (a software product made by Cypher Tec Inc.) are used.

These card readers optically read documents like business cards and classify words in the documents into categories such as name, company, and job title and store them into databases.

However, the classification performances of the card readers have not reached a satisfactory level yet. For example, the apparatuses cannot divide an address into smaller categories and cannot differentiate between telephone numbers and FAX numbers. Generally, they divide an address into a state, a city, a street, etc. In some business cards, a state, a city, and a street may be altogether put into a street category, and in other business cards, a ZIP code may be classified into an address category. This is the same for a telephone number and a FAX number. Both of them may be put into a telephone number category altogether.

Furthermore, the current card readers are insufficient for recognizing characters. This sometimes cause inconveniences to the operators in using the database.

SUMMARY OF THE INVENTION

Therefore, an object of the present invention is to provide a category classification apparatus with improved category classification performance for classifying words in optically read documents into categories.

Another object of the present invention is to provide an apparatus which can process documents with high character recognition rate.

The above objects are fulfilled by an apparatus for assigning categories to words in a document image, comprising: a character row extracting means for extracting character row images from the document image; a character extracting means for extracting character images for each character row image in units of a character image; a character recognizing means for recognizing characters from the extracted character images and outputting recognition results; a word detecting means for detecting words for each character row by using positions of the extracted character images and the character recognition results; a keyword dictionary for prestoring categories to be assigned and groups of keyword character rows belonging to the categories; a category correction rule dictionary for prestoring rules used for any of correcting a category of a word and assigning a category to a word in terms of relation between the word and other words in a same character row; and a category assigning means for comparing each character recognition result for each detected word with the groups of keyword character rows in the keyword dictionary, and, if a matching keyword character row is detected, assigning a category to which the keyword character row belongs to the word, then, referring to the category correction rule dictionary, and, if any applicable rule is detected, any of correcting the category assigned to the word and assigning a category to the word according to the applicable rule.

In the above construction, the category assigning means further comprises: a joining means for joining two of more than one category-undefined word detected in a same character row after the keyword dictionary has been referred to, the keyword dictionary being referred to again for the joined words regarded as a new undefined word.

In the above construction, the category assigning means comprises: a referring unit for referring to the keyword dictionary; and a category correcting unit for any of correcting and assigning a category by referring to the category correction rule dictionary; and wherein the referring unit comprises: a selecting unit for selecting from the keyword dictionary keyword character rows with the same number of characters as the detected word, keyword character rows having less characters than the detected word by one character, and keyword character rows having more characters than the detected word by one character; and a comparing unit for comparing characters of the detected word with those of the selected keyword character rows, the comparing unit, if a number of characters of the detected word differ from that of the keyword character row, comparing the characters by masking a character of a larger one.

In the above construction, the category correcting unit comprises: a numeral counting unit for counting numerals in one of an undefined word and more than one of consecutive undefined words in a same character row; and a numeral category assigning unit for assigning a category for numeral character rows to the word if the counted value of the numeral counting unit exceeds a certain value.

The above construction further comprises: a category-word dictionary for prestoring words to be referred to for each category; and a word correcting means for, after the category assignment and correction by the category assigning means have been completed, selecting a part of the category-word dictionary suitable for a category for each word, comparing the word with words in the part of the category-word dictionary, and replacing the recognition result of the word by a matched word detected in the category-word dictionary.

In the above construction, the category assigning means further comprises: a joining means for joining two of more than one category-undefined word detected in a same character row after the keyword dictionary has been referred to, the keyword dictionary being referred to again for the joined words regarded as a new undefined word.

In the above construction, the category assigning means comprises: a referring unit for referring to the keyword dictionary; and a category correcting unit for any of correcting and assigning a category by referring to the category correction rule dictionary; and wherein the referring unit comprises: a selecting unit for selecting from the keyword dictionary keyword character rows with the same number of characters as the detected word, keyword character rows having less characters than the detected word by one character, and keyword character rows having more characters than the detected word by one character; and a comparing unit for comparing characters of the detected word with those of the selected keyword character rows, the comparing unit, if a number of characters of the detected word differ from that of the keyword character row, comparing the characters by masking a character of a larger one.

In the above construction, the category correcting unit comprises: a numeral counting unit for counting numerals in one of an undefined word and more than one of consecutive undefined words in a same character row; and a numeral category assigning unit for assigning a category for numeral character rows to the word if the counted value of the numeral counting unit exceeds a certain value.

The above objects are fulfilled by an apparatus for assigning categories to words in a document image, comprising: a character row extracting means for extracting character row images from the document image; a block extracting means for extracting character rows in a range of certain distances as a block by comparing coordinates of each extracted character row; a character extracting means for extracting character images for each character row image in units of a character image; a character recognizing means for recognizing characters from the extracted character images and outputting recognition results; a word detecting means for detecting words for each character row by using positions of the extracted character images and the character recognition results; a keyword dictionary for prestoring categories to be assigned and groups of keyword character rows belonging to the categories; a first category correction rule dictionary for prestoring rules used for any of correcting a category of a word and assigning a category to a word in terms of relation between the word and other words in a same character row; a second category correction rule dictionary for prestoring rules of relation between categories of words in different character rows in a same block; and a category assigning means for comparing each character recognition result for each detected word with the groups of keyword character rows in the keyword dictionary, and, if a matching keyword character row is detected, assigning a category to which the keyword character row belongs to the word, then, referring to the first and second category correction rule dictionaries, and, if any applicable rule is detected, any of correcting the category assigned to the word and assigning a category to the word according to the applicable rule.

In the above construction, the category assigning means further comprises: a joining means for joining two of more than one category-undefined word detected in a same character row after the keyword dictionary has been referred to, the keyword dictionary being referred to again for the joined words regarded as a new undefined word.

In the above construction, the category assigning means comprises: a referring unit for referring to the keyword dictionary; and a category correcting unit for any of correcting and assigning a category by referring to the category correction rule dictionary; and wherein the referring unit comprises: a selecting unit for selecting from the keyword dictionary keyword character rows with the same number of characters as the detected word, keyword character rows having less characters than the detected word by one character, and keyword character rows having more characters than the detected word by one character; and a comparing unit for comparing characters of the detected word with those of the selected keyword character rows, the comparing unit, if a number of characters of the detected word differ from that of the keyword character row, comparing the characters by masking a character of a larger one.

In the above construction, the category correcting unit comprises: a numeral counting unit for counting numerals in one of an undefined word and more than one of consecutive undefined words in a same character row; and a numeral category assigning unit for assigning a category for numeral character rows to the word if the counted value of the numeral counting unit exceeds a certain value.

The above construction further comprises: a category-word dictionary for prestoring words to be referred to for each category; and a word correcting means for, after the category assignment and correction by the category assigning means have been completed, selecting a part of the category-word dictionary suitable for a category for each word, comparing the word with words in the part of the category-word dictionary, and replacing the recognition result of the word by a matched word detected in the category-word dictionary.

The above objects are fulfilled by a method for assigning categories to words in a document image, comprising: a first step for extracting character row images from the document image; a second step for extracting character images for each character row image in units of a character image; a third step for recognizing characters from the extracted character images and outputting recognition results; a fourth step for detecting words for each character row by using positions of the extracted character images and the character recognition results; a fifth step for comparing the detected word with the groups of keyword character rows in a keyword dictionary, and, if a matching keyword character row is detected, assigning a category to which the keyword character row belongs to the word, the keyword dictionary prestoring categories to be assigned and groups of keyword character rows belonging to the categories; a sixth step for referring to a category correction rule dictionary, and, if any applicable rule is detected, correcting the category assigned to the word according to the applicable rule, the category correction rule dictionary prestoring rules used for any of correcting a category of a word and assigning a category to a word in terms of relation between the word and other words in a same character row; and a seventh step for outputting recognition results of words and categories related to the words obtained from the previous steps.

In the above, the fifth step further comprises: a sub-step for detecting category-undefined words other than a category-undefined word in a same character row after the keyword dictionary has been referred to; and a sub-step for, if detected, joining two words and referring to the keyword dictionary again for the joined words regarded as a new undefined word.

In the above, the fifth step comprises: a sub-step for selecting from the keyword dictionary keyword character rows with the same number of characters as the detected word, keyword character rows having less characters than the detected word by one character, and keyword character rows having more characters than the detected word by one character; and a sub-step for comparing characters of the detected word with those of the selected keyword character rows, the comparing unit, if a number of characters of the detected word differ from that of the keyword character row, comparing the characters by masking a character of a larger one.

In the above, the sixth step comprises: a sub-step for counting numerals in one of an undefined word and more than one of consecutive undefined words in a same character row; and a sub-step for assigning a category for numeral character rows to the word if the counted value of the numeral counting unit exceeds a certain value.

The above method further comprises: a sub-step for, after the category assignment and correction by the category assigning means have been completed, selecting a part of a category-word dictionary suitable for a category for each word, comparing the word with words in the part of the category-word dictionary, and replacing the recognition result of the word by a matched word detected in the category-word dictionary, the category-word dictionary prestoring words to be referred to for each category.

In the above, the fifth step further comprises: a sub-step for detecting category-undefined words other than a category-undefined word in a same character row after the keyword dictionary has been referred to; and a sub-step for, if detected, joining two words and referring to the keyword dictionary again for the joined words regarded as a new undefined word.

In the above, the fifth step comprises: a sub-step for selecting from the keyword dictionary keyword character rows with the same number of characters as the detected word, keyword character rows having less characters than the detected word by one character, and keyword character rows having more characters than the detected word by one character; and a sub-step for comparing characters of the detected word with those of the selected keyword character rows, the comparing unit, if a number of characters of the detected word differ from that of the keyword character row, comparing the characters by masking a character of a larger one.

In the above, the sixth step comprises: a sub-step for counting numerals in one of an undefined word and more than one of consecutive undefined words in a same character row; and a sub-step for assigning a category for numeral character rows to the word if the counted value of the numeral counting unit exceeds a certain value.

The above objects are fulfilled by a method for assigning categories to words in a document image, comprising: a first step for extracting character row images from the document image; a second step for extracting character rows in a range of certain distances as a block by comparing coordinates of each extracted character row; a third step for extracting character images for each character row image in units of a character image; a fourth step for recognizing characters from the extracted character images and outputting recognition results; a fifth step for detecting words for each character row by using positions of the extracted character images and the character recognition results; a sixth step for comparing the detected word with groups of keyword character rows in a keyword dictionary, and, if a matching keyword character row is detected, assigning a category to which the keyword character row belongs to the word, the keyword dictionary prestoring categories to be assigned and the groups of keyword character rows belonging to the categories; a seventh step for referring to a first category correction rule dictionary and a second category correction rule dictionary, and, if any applicable rule is detected, any of correcting the category assigned to the word and assigning a category according to the applicable rule, the first category correction rule dictionary prestoring rules used for any of correcting a category of a word and assigning a category to a word in terms of relation between the word and other words in a same character row, and the second category correction rule dictionary prestoring rules of relation between categories of words in different character rows in a same block; and an eighth step for outputting recognition results of words and categories related to the words obtained from the previous steps.

The above method further comprises: a step for, after the category assignment and correction by the category assigning means have been completed, selecting a part of a category-word dictionary suitable for a category for each word, comparing the word with words in the part of the category-word dictionary, and replacing the recognition result of the word by a matched word detected in the category-word dictionary, the category-word dictionary prestoring words to be referred to for each category.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 is a table showing the results of character recognition performed for each character image extracted from the image data.

FIG. 5 is a table showing coordinate data for each character image.

FIG. 8 shows a keyword dictionary and a category-word dictionary.

FIG. 9 shows how a category has been assigned to each word and corrected.

FIG. 10 shows the final results of the category assignment.

DESCRIPTION OF THE PREFERRED EMBODIMENT

<First Embodiment>

Figure 1:
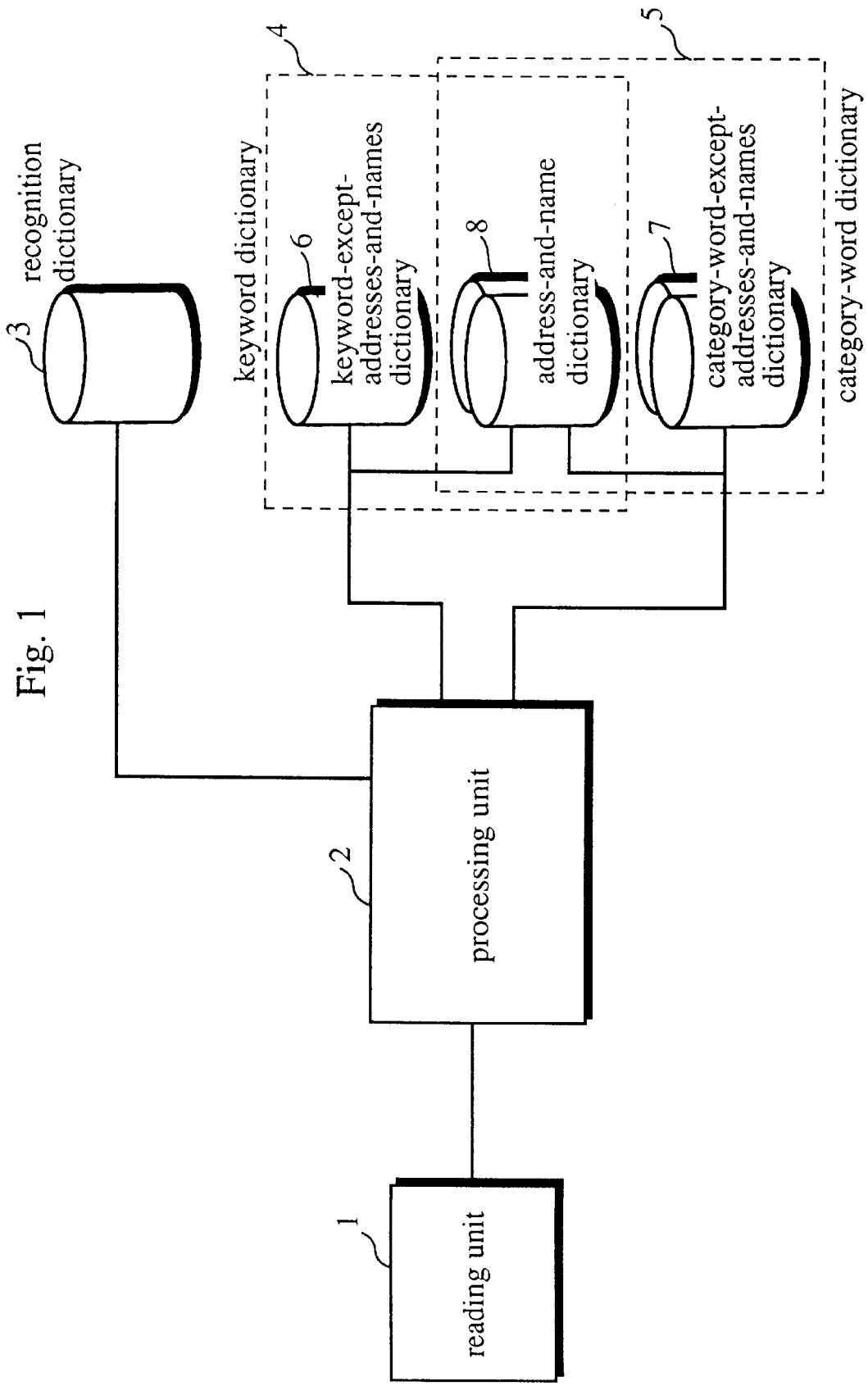
FIG. 1 is a block diagram of a category assignment apparatus which is an embodiment of the present invention.

FIG. 1 shows a construction of a category classification apparatus as an embodiment of the present invention. The apparatus comprises optical reading unit 1, processing unit 2, recognition dictionary 3, keyword dictionary 4, and category-word dictionary 5. Optical reading unit 1, comprising a Charge Coupled Device (CCD) and other components, optically reads documents such as business cards.

Figure 2:
FIG. 2 shows a business card which is a target of the category assignment by the apparatus of the present invention.

FIG. 2 shows a business card as a sample document to be read.

Figure 11:
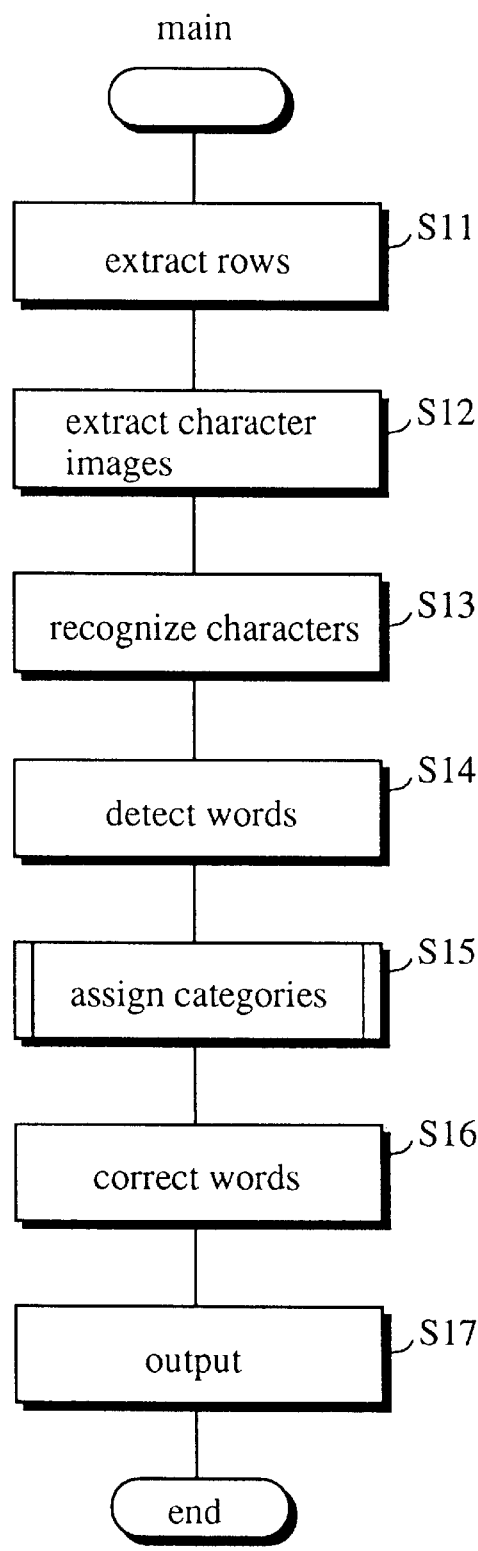
FIG. 11 shows a main flowchart of an operation of the present apparatus.

Processing unit 2 processes image data provided by optical reading unit 1 according to the flowchart shown in FIG. 11, and finally outputs a name, a job title, an address (a state, a city, and a street) written on the card. The image data is the data in the target document after light/electricity conversion, the data not having been divided into any characters or words, and represented by white pixel, black pixel, and other color pixels.

Figure 3:
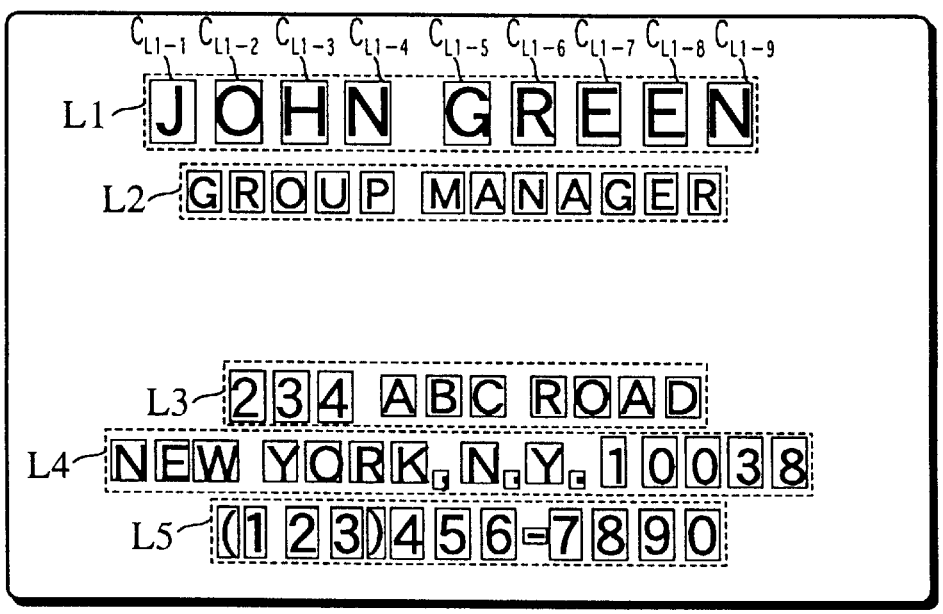
FIG. 3 shows how rows and characters have been extracted from image data read from the business card.

See FIG. 11. At row extracting step S11, character rows are extracted from the image data of the card by using a known method in which black pixels are projected in the direction of X (horizontally) and the continuity of the black pixels is checked in the direction of Y. L1 to L4 in FIG. 3 represent rows extracted in the above step S11 from the card shown in FIG. 2. The row extraction is not explained in detail here because it is a known technique.

At character image extracting step S12, characters are extracted from each row by using a known method in which the continuity of black pixels is checked. $C_{L1-1}$, $C_{L1-2}$, . . . shown in FIG. 3 represent extracted character images. The character image extraction from row images is not explained in detail here because it is also a known technique.

At character recognizing step S13, characters are recognized by comparing each extracted character image with image patterns stored in recognition dictionary 3, and by detecting a matched image pattern. FIG. 4 shows the recognition results for character images $C_{L1-1}$, $C_{L1-2}$, . . . of FIG. 3. As understood from FIG. 4, in the present embodiment, first-rank to third-rank recognition candidates are output for each character image. The character recognition is not explained in detail here because it is also a known method.

Figure 6:
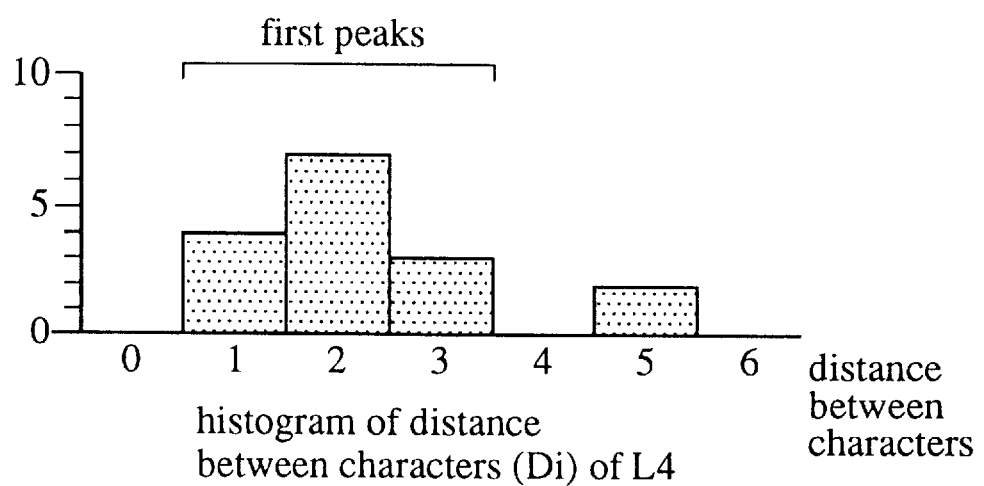
FIG. 6 is a histogram of the distance between characters made from the table of FIG. 5.
Figure 7:
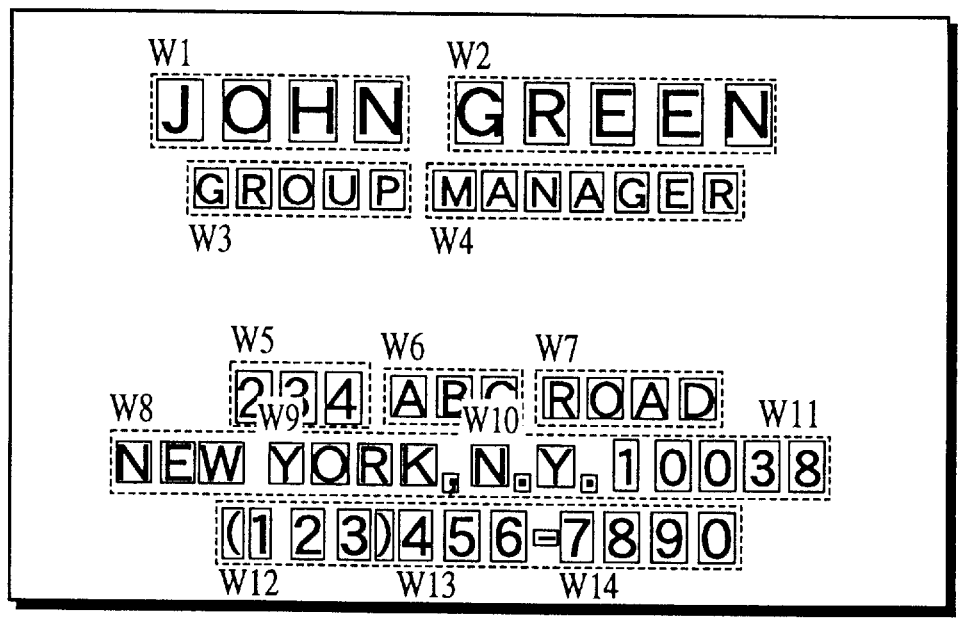
FIG. 7 shows how words have been detected by using the results shown in FIG. 6 from the business card.

In word detecting step S14, words are detected by using the positions of recognition target characters extracted in character extracting step S12. First, a histogram of distance between characters, Di, is made by obtaining the distances from equation Di=Xs(i+1)−Xei, where Xsi and Xei are respectively the start and end positions of recognition target character in the same row in the direction of X coordinate. In the histogram, the distance between characters increases in the direction of X coordinate, and the value of the distance between characters at the end of the first peaks, which is greater than the first value of the first peaks, is used as threshold value T regarded as a space between words. A character Ci, which satisfies condition Di>T is regarded as a word-dividing character. FIG. 5 shows extraction results for character row 4, and FIG. 6 shows the histogram of distance between characters Di for character row 4. The last value of the first peaks, "4", is regarded as threshold value T, and recognition target characters $C_{L4-3}$ and $C_{L4-12}$ are regarded as word-dividing characters. Furthermore, recognition target characters having one of character codes ",", "-", ":", ";", and "/" as their recognition candidate character are regarded as word dividing characters, and the recognition target characters are used for detecting words. In character row L4, recognition target character $C_{L4-8}$ is a word dividing character. Words W1, W2, . . . shown in FIG. 7 are all the words detected from the document image of FIG. 2.

In category assigning step S15, words W1, W2, . . . detected in step S14 are classified into categories using keyword dictionary 4.

Keyword dictionary 4 is explained first. Keyword dictionary 4 comprises keyword-except-addresses-and-names dictionary 6 and address-and-name dictionary 8. FIG. 8 (a) shows a construction of keyword-except-addresses-and-names dictionary 6. As shown in this figure, dictionary 6 have general categories such as "COMPANY" and "SEC-TION" except categories for addresses and names. Each category contains keywords. For example, category "COMPANY" contains keywords such as "co", "company", "inc", etc. FIG. 8 (b) shows name dictionary 81 and address dictionary 82. Name dictionary 81 is divided into "FIRST NAME" and "LAST NAME". Keywords in each category are divided into groups according to their number of characters, and each group contains keywords in the order of frequency. For example, in the division of four-character in "FIRST NAME", "John", "mary", . . . "jean" are described as frequency α or higher, and "rose", ... as a lower frequency.

Address dictionary 82 has keywords for state names and city names divided into groups according to their number of characters. Note that capitol letters of recognition candidate characters are replaced by small letters when the characters are checked on whether they match keywords in the keyword dictionary and words in category-word dictionary 7.

Although not shown in the figures, processing unit 2 stores rules used in category assigning step S15. The five rules are as follows:

(1) When a word for "SECTION" category is adjacent to a word for "TITLE" category, both words are regarded as words for "TITLE" category.

(2) When any category has not been assigned to a word on the lefthand adjacent a word for "STREET" category, the former word is regarded as a word for "STREET" category.

(3) When any category has not been assigned to a word on the lefthand adjacent a word for "STATE" category, the word is regarded as a word for "CITY" category.

(4) When any category has not been assigned to a word on the right hand adjacent a word for "STATE" category, the number of the characters of the word is calculated. Then, if the word has five characters, numerals of the first rank recognition candidate characters are calculated. If the word has three or more numerals, the word is regarded as a word for "ZIP" category.

(5) When any category has not been assigned to any of consecutive three words in a same row, the numbers of the characters of the words are calculated. Then, if the word on the lefthand has 3 to 5 characters, and the middle word 3 to 4, and the word on the right hand 4, and a half or more of the first rank candidate characters of each word are numerals, the words are regarded as those for "TEL" category.

Figure 12A:
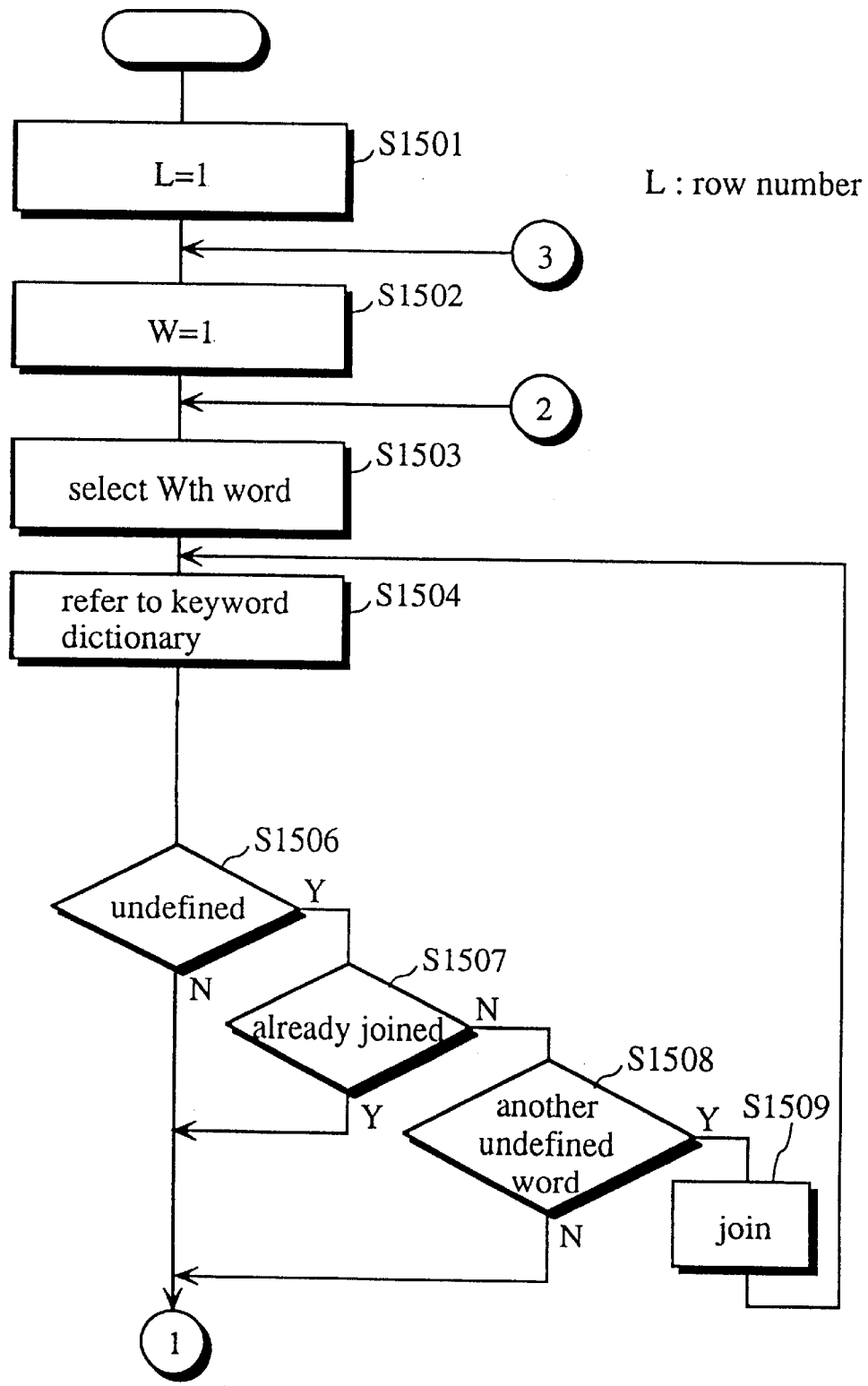
FIG. 12 (A) and (B) show flowcharts of the category assignment process.
Figure 12B:
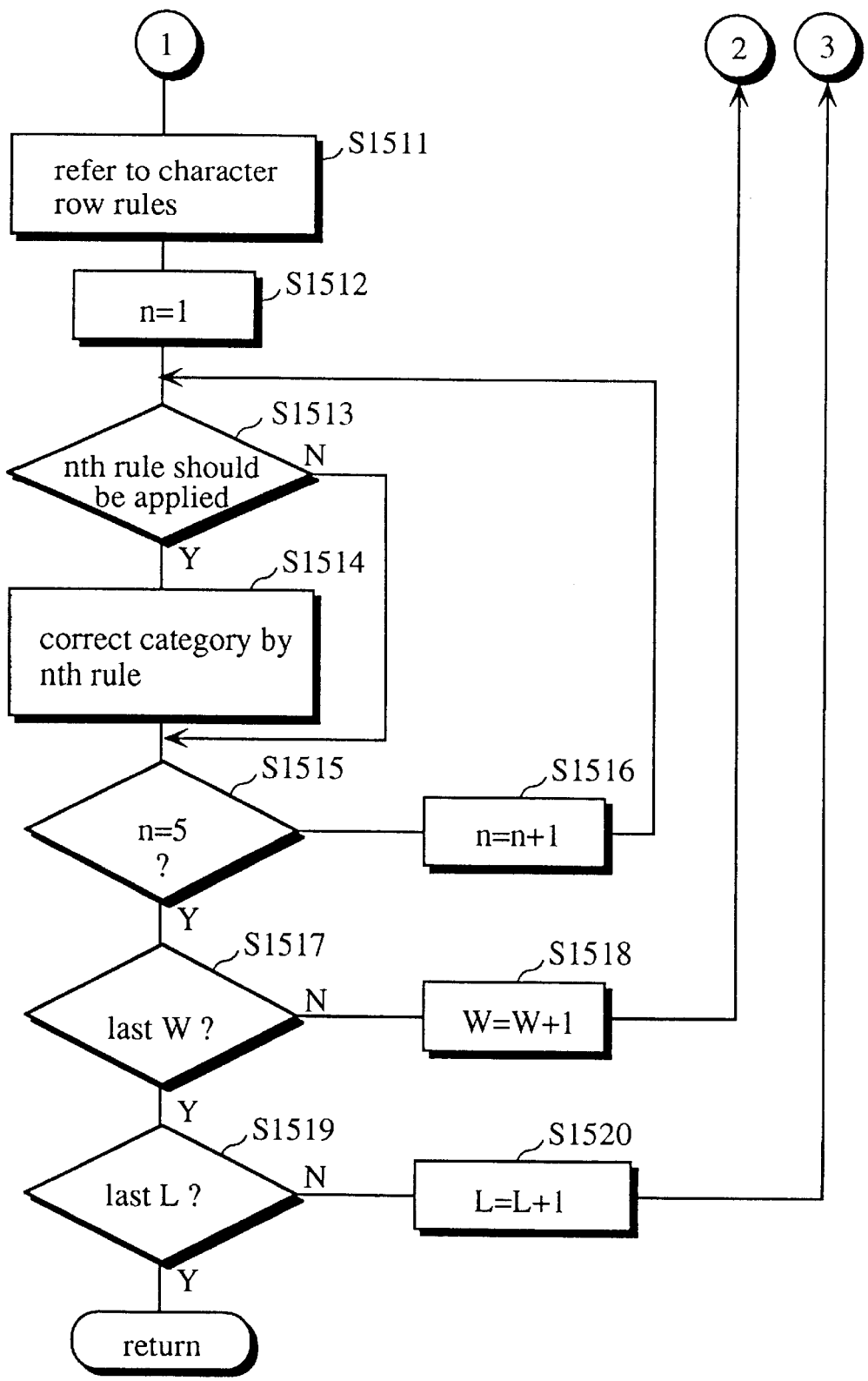

FIG. 12 (A) and (B) are flowcharts of category assignment in which dictionaries 6 and 8 and the above rules are used. Characters L, W, and n used in the figure respectively represent variables for serial row number, serial word number in a row from left to right, and number of the above rules (1) to (5).

Suppose data shown in FIG. 7 has been obtained as a result of a word detection. At step S1501, first, "1" is set as the row number, then "JOHN", the first word from the left in the row, is selected as a target word for category assignment (S1502 and S1503). Keyword dictionaries 6 and 8 are referred to for word "JOHN" (S1504). As a result of the reference, category "FIRST NAME" is assigned to the selected word "JOHN" because name dictionary 81 has keyword "john" in frequency α or higher in the division of four-character in category "FIRST NAME". After a category is assigned to the word, it is judged that the word has been defined (S1506), then control goes to process of character row rule reference (S1511). Since the word is the first word and belongs to "FIRST NAME" category, the word does not need to be applied any rule. Therefore, the processing proceeds as S1513 →S1515→S1517→S1518, and the next word with W=2 is specified. Control returns to S1503, and the next word, "GREEN", is selected. Keyword dictionaries are referred to for this word the same as for "JOHN" (S1504). After "LAST NAME" category is assigned to the word, the character row rules are referred to (S1511). Since the word does not need to be applied any rule again, control goes to S1517. At S1517, it is judged that the word is the last word in the row. The next row is specified (S1519 and S1520). "W" is reset to W=1, and the above processes are repeated for the first word in the second row, "GROUP". "Matched keyword" column of FIG. 9 shows the category names assigned to the words after the keyword reference processed as above. Note that W1, W2, . . . W14 in FIG. 9 match the word numbers in FIG. 7, but do not match the numbers for variable W in the flowchart of FIG. 12. "W" in FIG. 12 only represents the order of characters in a same row.

In "matched keyword" column of FIG. 9, words to which any category has not been assigned are equal to those that have not been defined yet. For example, W5 "234" and W6 "ABC" have not been defined yet. At step S1506 in the flowchart of FIG. 12, such an undefined word is detected. Then, if another undefined word once processed is detected in a same row (S1508), both words are joined (S1509) only once (S1507). A keyword reference is processed (S1504) for the joined word. When W6 "ABC" is processed, W5 and W6 are joined at S1509 because they are both undefined. A keyword reference is processed for the joined word "234 ABC". However, since the joined word does not match any word in dictionaries 6, 81, and 82, it is not defined, and the join is canceled. Also, since any of words W5 "234" and W6 "ABC" does not need to be applied any character row rule, category correction at S1514 is not processed for selected words W5 and W6. However, when selected word W7, "ROAD", is processed, category "STREET" is assigned to the word. Then, when the character row rule reference is processed for W7, it is detected that rule 2 should be applied to the word. By executing the rule, the category of W7 is assigned to W5 and W6 also (S1514).

After the keyword dictionary reference, correct categories are assigned to even undefined words by applying any of the character row rules. "Corrected category" column of FIG. 9 shows the results of category correction for each word in FIG. 7. Note that even though categories have been assigned to all the words in FIG. 9, there may be a case where some words are not defined after words are joined and character row rules are applied. "Undefined words" mean that they have not been assigned any categories, but also mean that they have been assigned undefined categories. The expression, "assignment of undefined category", may be used in the succeeding description.

Figure 13A:
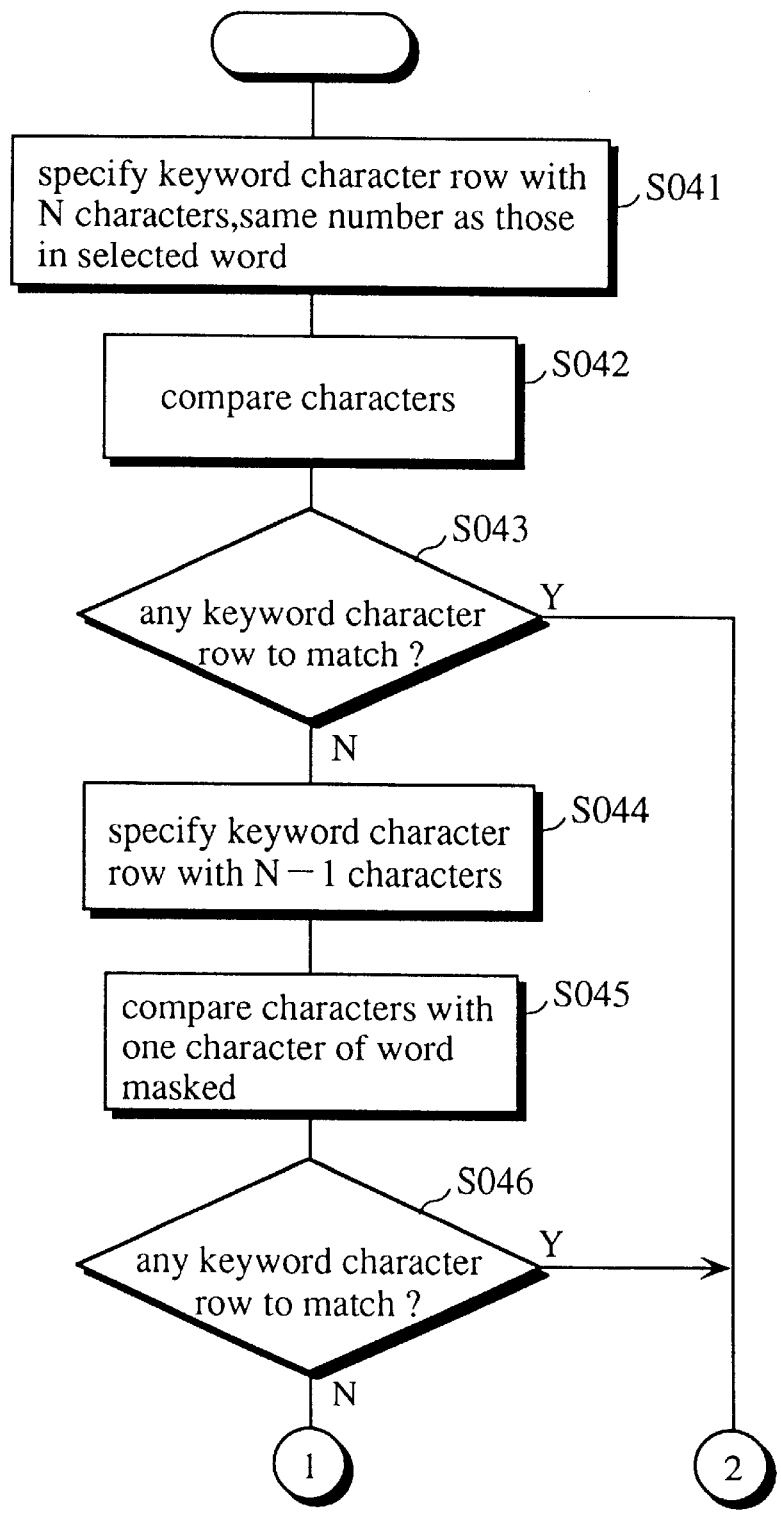
FIG. 13 (A) and (B) show flowcharts of the keyword dictionary reference process.
Figure 13B:
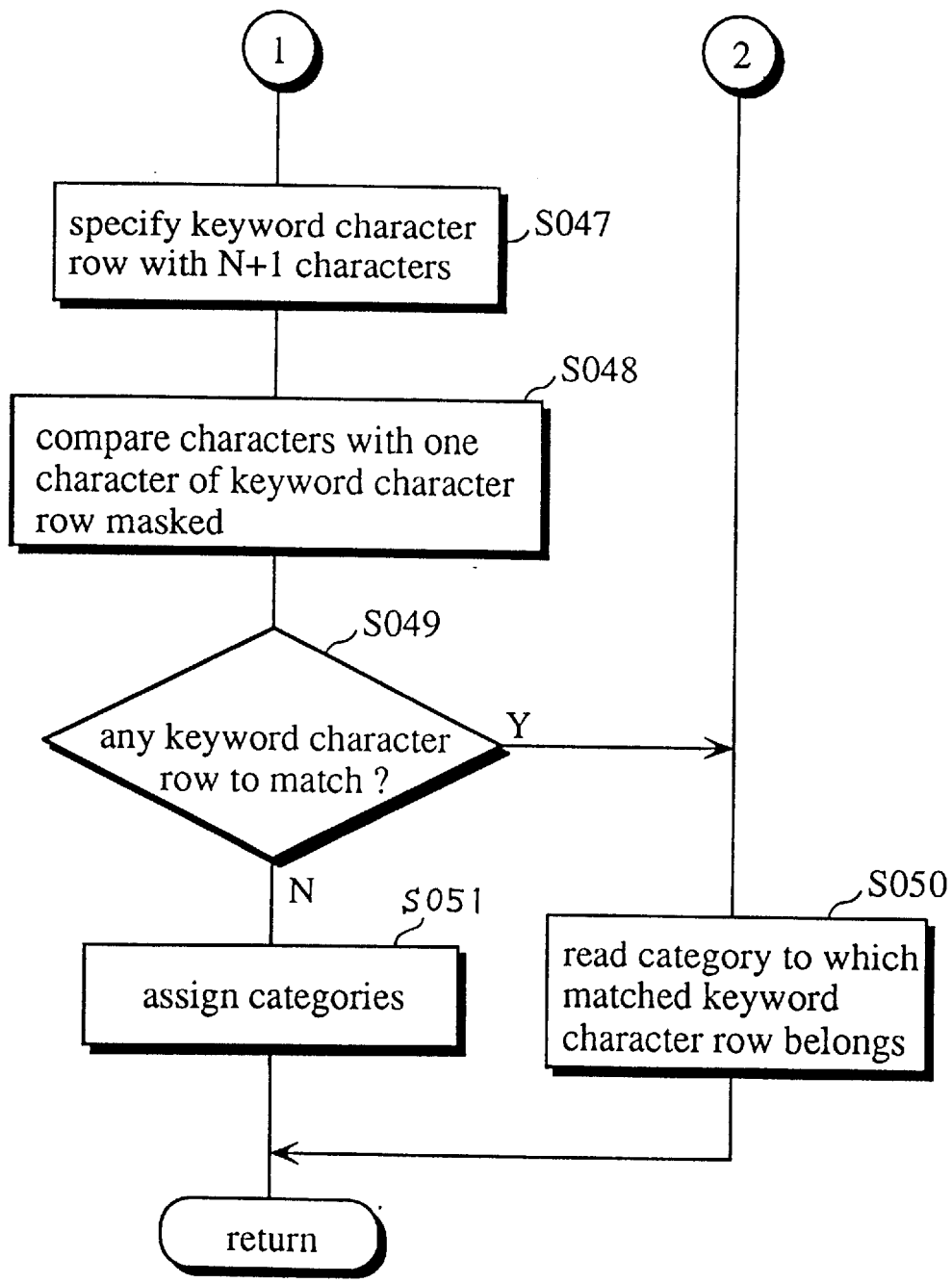

FIG. 13 (A) and (B) are flowcharts showing keyword reference (S1504) in FIG. 12 in detail. In keyword dictionary reference, generally, each character of a selected word is compared with each character of keyword character rows. However, when characters are extracted from image data optically read from a document, as in the present apparatus, the characters may be affected by the resolution of the optical parts or some irregularities in reading. As a result, for example, small letter "n" may be recognized as "11" consisting of two characters, or "rn" written with little space in between may be extracted as "m" consisting of one character. Therefore, if the number of characters of a selected word is N, the keyword reference of the present apparatus selects keyword character rows for three types of numbers of characters (N, N−1, and N+1) for comparison. When the number, N, of characters of the selected word is the same as that of a keyword character row, comparison is processed character by character. If any of the character rows is one character less than the other, one character of the character row with more characters is masked and the rest of the characters are used for comparison. Steps S041 to S043, S044 to S046, and S047 to S049 in FIG. 13 respectively show a process of a selected word and a keyword character row both with the same number of characters, a selected word and a keyword character row one character less than the selected word, and a keyword character row and a selected word one character less than the keyword character row. If any keyword character row to match the selected word is detected at any of the above processes, a category to which the matched keyword character row belongs is read, and the category is assigned to the selected word (S050); if not detected, no category is read and an undefined category is assigned to the selected word (S051).

Figure 14A:
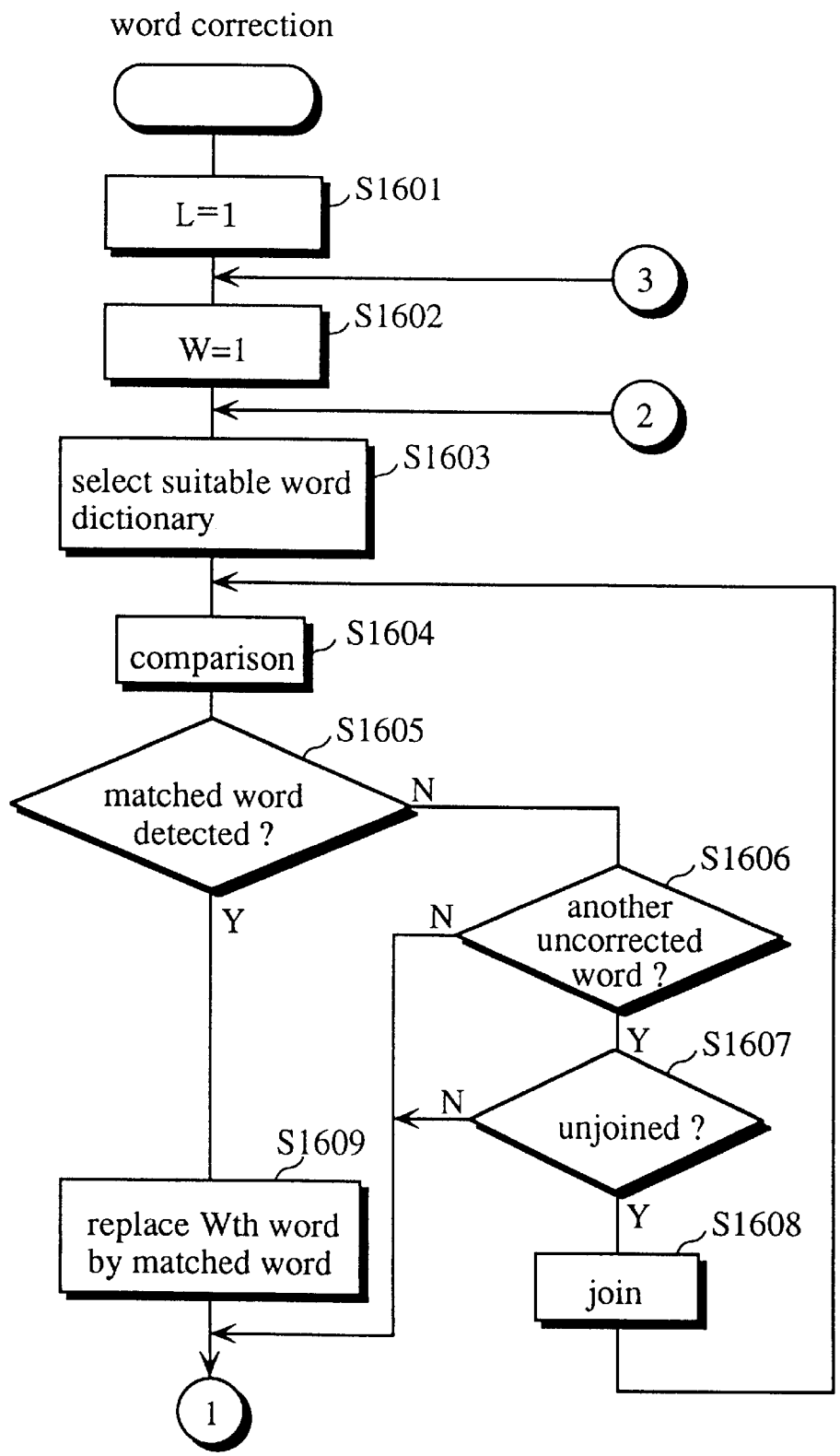
FIG. 14 shows a flowchart of the word correction process.
Figure 14B:
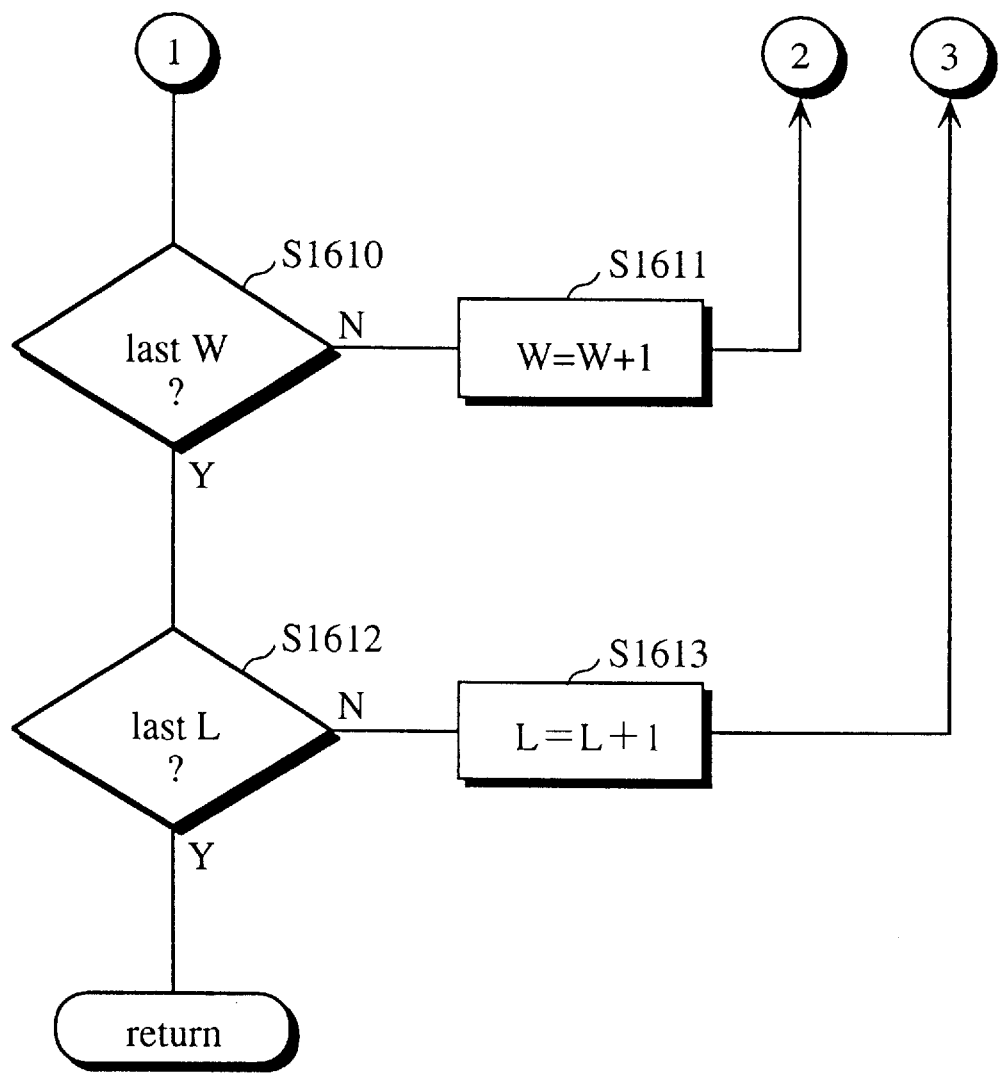

In FIG. 11, at word correction step S16, a category-word dictionary which corresponds to a category assigned at category assignment step S15 is selected, and the dictionary is referred to for a detected word to correct the category. Category-word dictionary 5 comprises category-word-except-addresses-and-names dictionary 7 and address-and-name dictionary 8. Address-and-name dictionary 8 is shared by keyword dictionary 4. As shown in FIG. 8 (C), category-word-except-addresses-and-names dictionary 7 stores categories and words belonging to each category. FIG. 14 (A) and (B) are flowcharts of word correction processes. "L" and "W" used in the figure are variables. L represents a row number. W represents the order of words from left to right in a same row. Steps S1601, S1602, and S1610–S1613 are provided to correct every word in every row (L) in a business card. At step S1603, word dictionaries are selected based on categories assigned to each word at S15. For example, if category "FIRST NAME" has been assigned to, the name dictionary is selected and referred to (S1604). In word comparison at S1605, keyword character rows with numbers of characters N, N−1, and N+1 are selected for a target word with number of characters N, as explained in FIG. 13 (A) and (B) for the keyword reference process, and comparison is processed with the same procedure as in FIG. 13. If any matched word is not detected after the comparison at S1604 (S1605), and if there is another uncorrected word in the same row and the uncorrected word has not been joined with other words (S1606, S1607), the target word and the uncorrected word are joined (S1608). The joined words are regarded as a word, and a dictionary is referred to for the word. Then, if any matched word is detected at any reference process, the correction target word is replaced by the detected word (S1609).

After word correction at S16 has been completed, relation between corrected words and corrected categories is output as a classification result. FIG. 10 shows such a word classification results.

<Second Embodiment>

Figure 18:
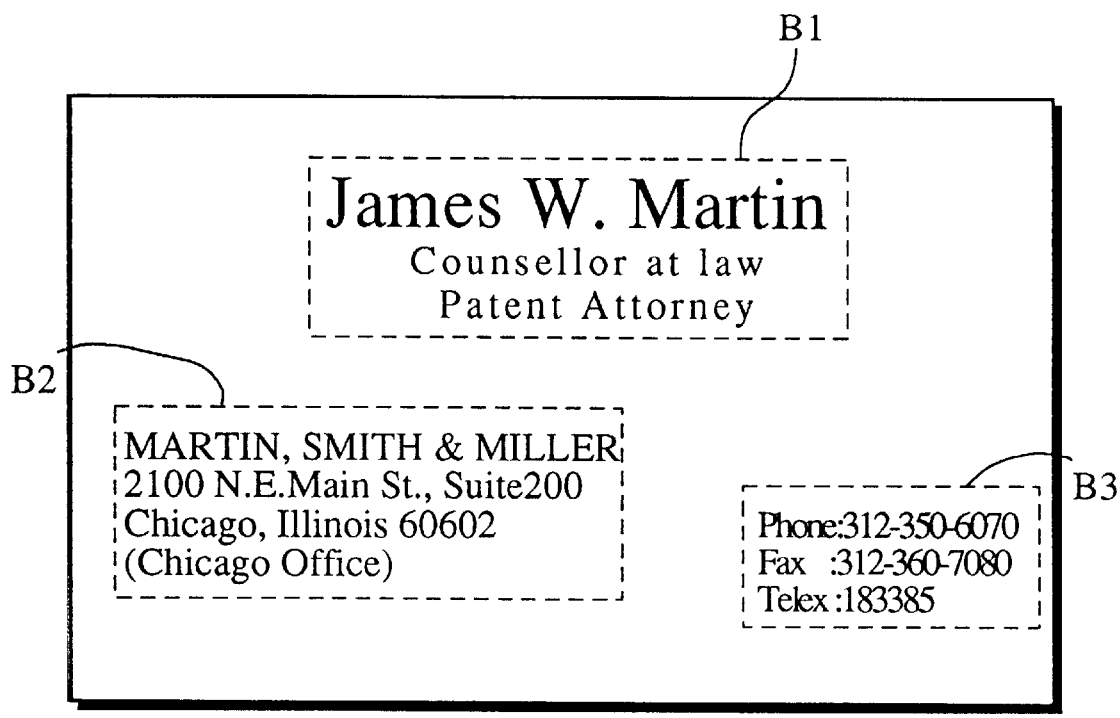
FIG. 18 is a business card for explaining the rules used in Second Embodiment.

Now, another embodiment of the present invention is explained. In the previous embodiment, category correction was performed by applying the character row rules to words in a same row. However, some cards are output without definition or category correction even if the character row rules are applied, and other cards are output with a company name incorrectly classified into a person name category. In this embodiment, to deal with such cases, character rows of cards are divided into blocks, and it is judged for each block whether the rules are applied to rows in the block to correct categories. The term "block" is used to indicate an area with higher density of black pixels than that of white background, such as B1, B2, and B3 in FIG. 18.

Figure 15:
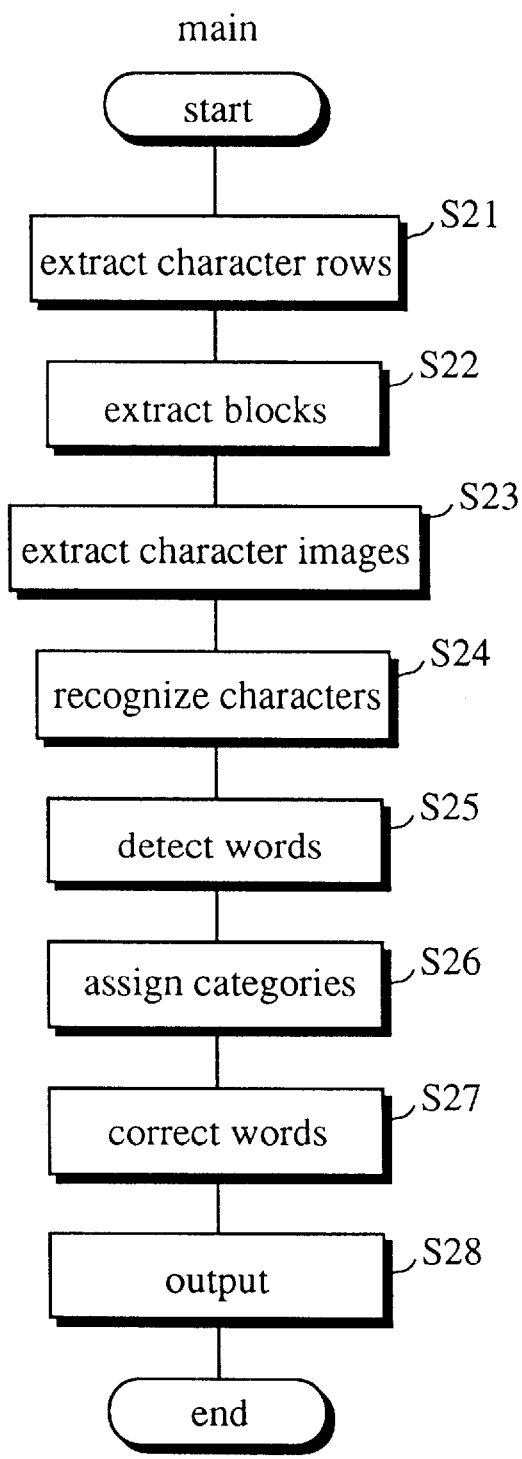
FIG. 15 shows a main flowchart of Second Embodiment of the present invention.

FIG. 15 is a main flowchart of Second Embodiment. The main flowchart differ from that of First Embodiment in that it has step S22 for block extraction process, it has rules added particularly for character rows in blocks, and it has additional steps in category assignment process (S26). These are explained below. Note that since a row can be divided into blocks, two or more character rows with wider spaces between them in the direction of X in a row are regarded as different from each other.

Figure 16A:
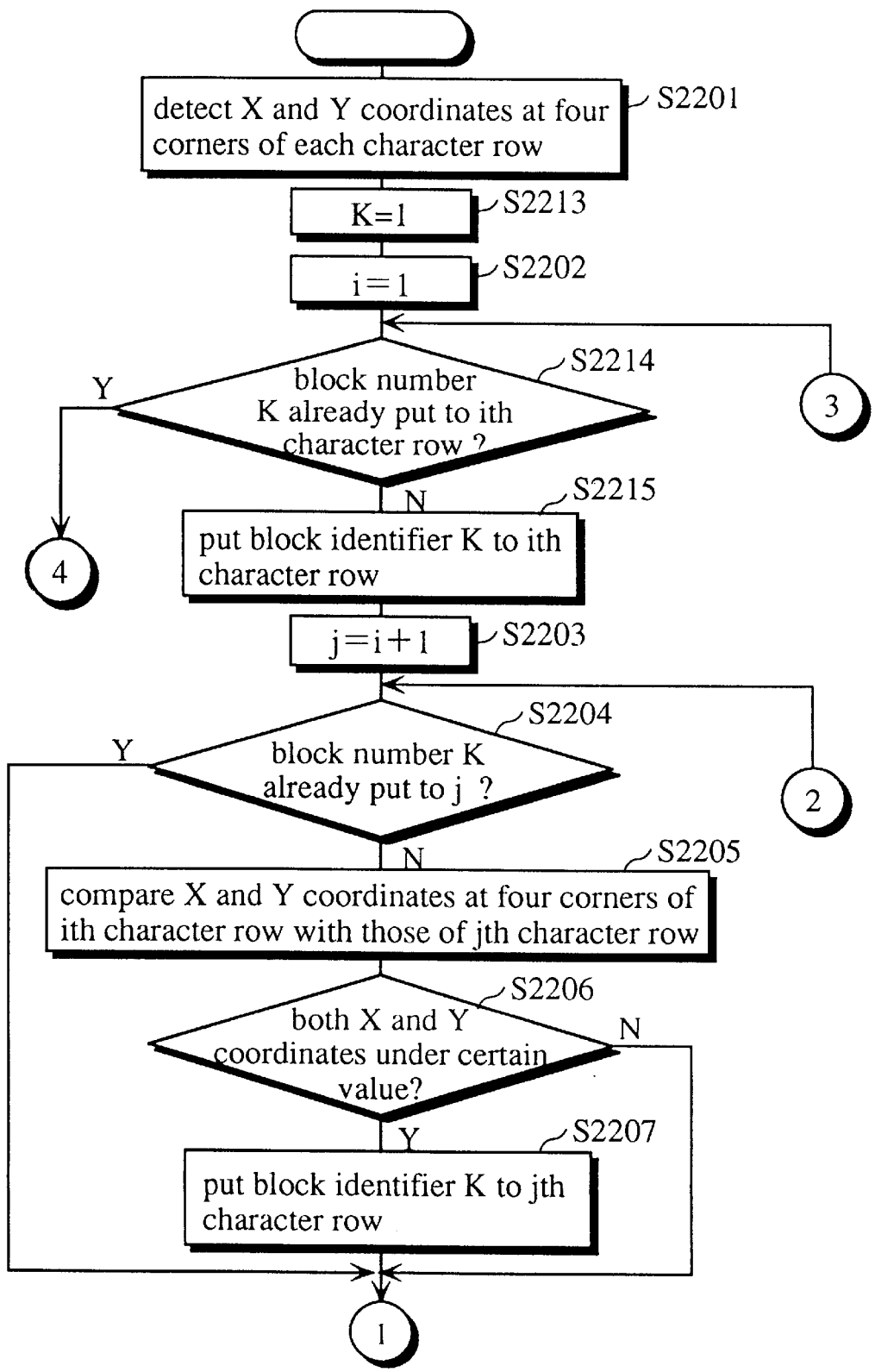
FIG. 16 (A) and (B) show flowcharts of the block extraction process.
Figure 16B:
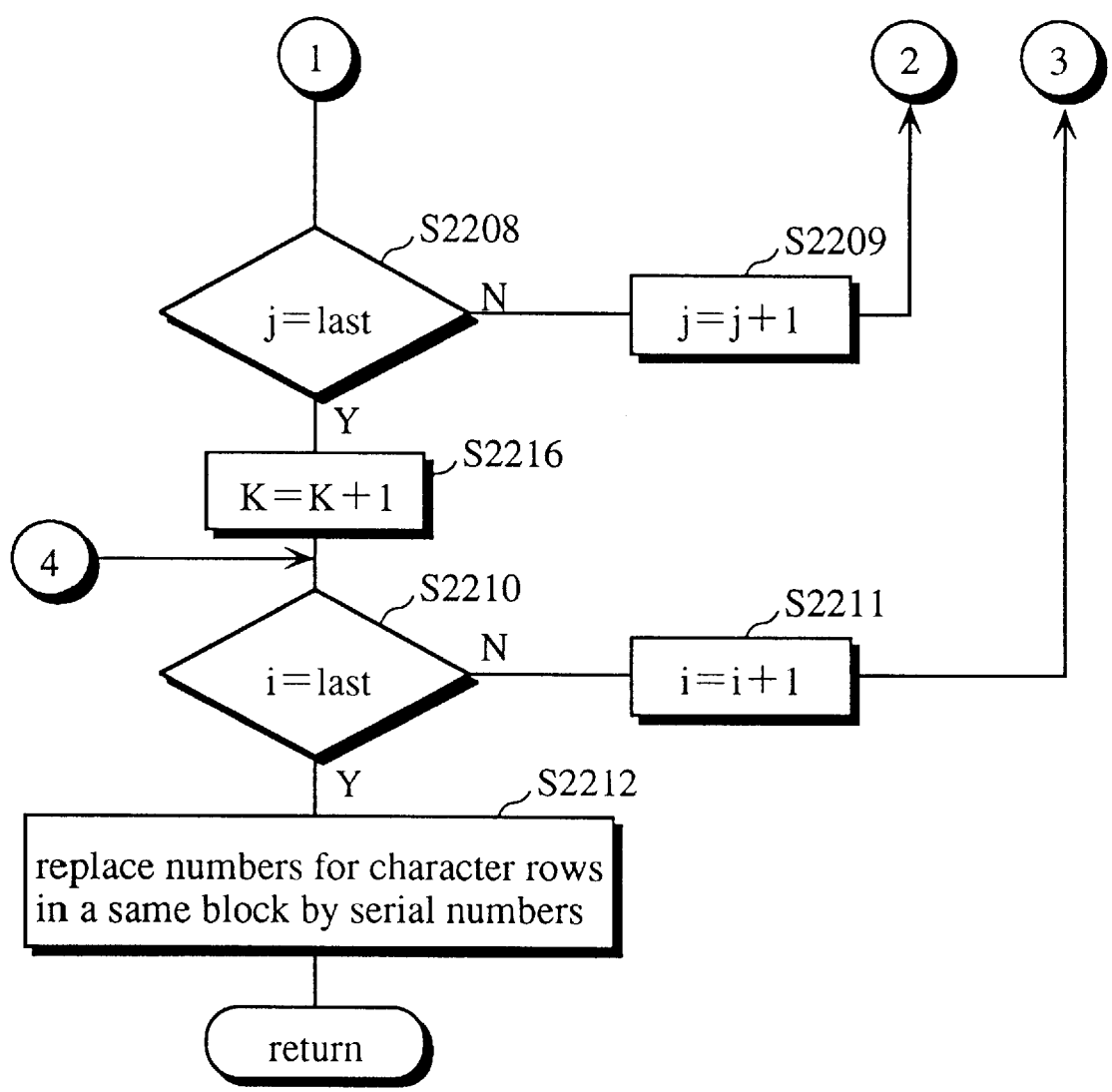

FIG. 16 (A) and (B) show the detailed block extraction process at S22. At S2201, X and Y coordinates at four corners of each character row are detected. The coordinates at four corners are X and Y coordinates at uppermost and lowermost positions at left and right edges. Since the coordinates have been obtained already in character row extraction, they can be detected. Note that block extraction is also possible by central coordinates or left-edge or right-edge coordinates. "K" appearing in S2213 indicates a block number (block identifier), and "i" and "j" in S2202 and S2203 character row numbers. Primary values are set as follows: 1 for K and i; and 2 for j. And after block identifier K=1 is put to the first character row (S2215), X and Y coordinates at four corners of both character rows are compared (S2205). If the difference between X and Y coordinates of both character rows is under a certain value, it is judged that the jth and ith character rows are in the same block (S2206), and block identifier K is put also to the jth character row (S2207). Character rows in a same block are detected by raising j until it reaches the last character row (S2208 and S2209). Then, K is raised (S2216) and i is raised (S2211). A character row larger than the above i by 1 is selected as the jth character row, and character rows belonging to block K=2 are detected by raising j again. If a block identifier has been put to the ith character row (S2214), the processing skips to S2210 and the next character row is selected as i (S2211), and character rows belonging to block K=2 are detected. On the other hand, if a block identifier has been put to the jth character row (S2204), the processing skips to S2208 and the next character row is selected as j (S2209), and it is judged whether this character row exists in a block to which ith character row belongs.

After all the character rows have been divided into blocks through the above processes (S2210), character row numbers in a same block are replaced by serial numbers (S2212).

The above block extraction is used in category assignment at step S26. In category assignment, categories in a same character row are corrected as shown in First Embodiment, then categories are corrected according to the flowchart of FIG. 17. The extended rules appearing at S2251 of this figure are as follows:

(1) A name and a post are written in a same block.

(2) In a same block, character rows for a name are adjacent to those for a post.

(3) Telephone, FAX, and Telex numbers are written in a same block.

(4) A state, a city, and a street exist in a same block. They are written in the order of street, city, state, and ZIP code.

(5) If "and" is detected at the left or right edge of a character row in a block, the category of the next or lower character row is applied; and "of", the category of the previous or upper character row.

Figure 17:
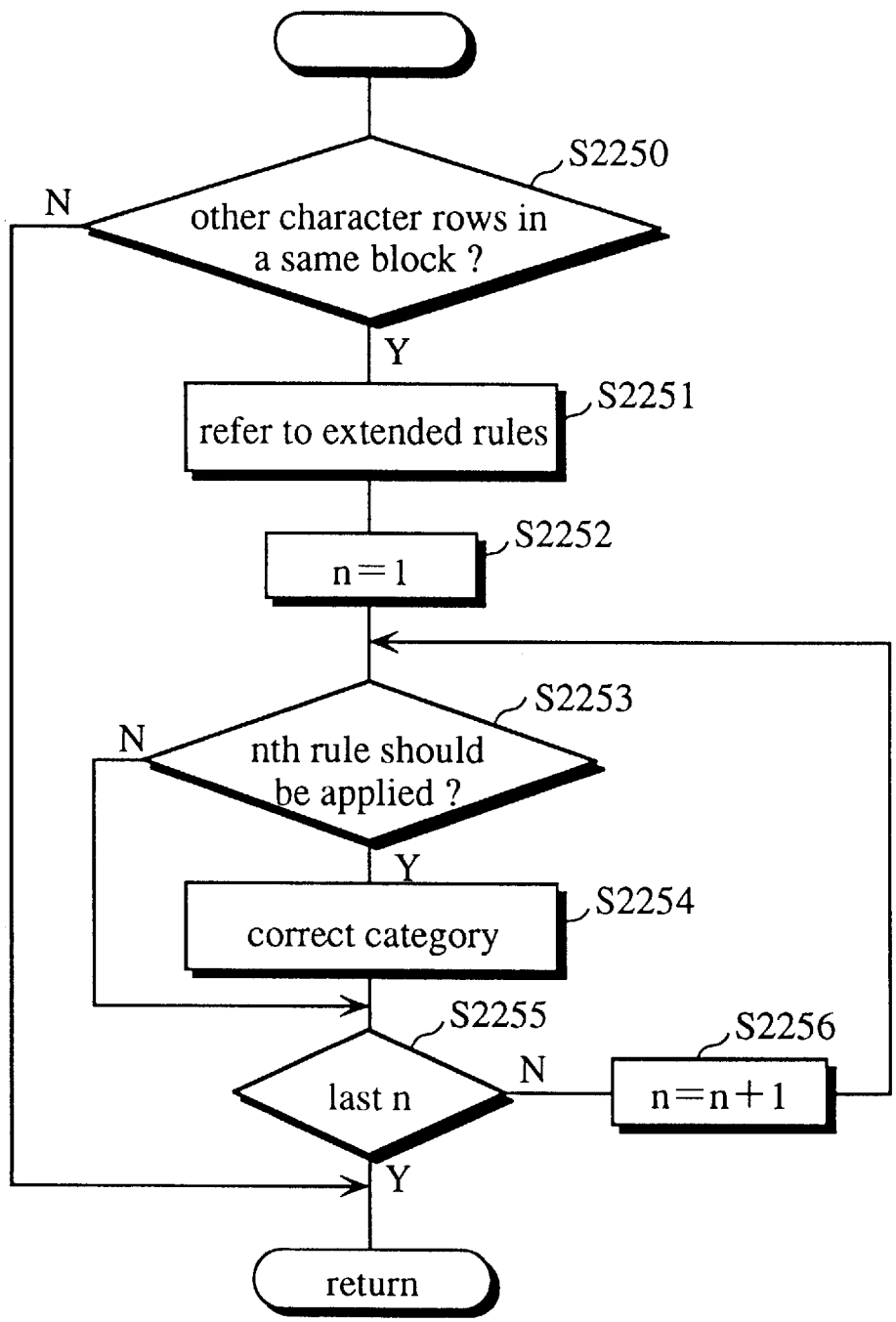
FIG. 17 shows a flowchart of the category correction process.

The process shown in FIG. 17 is performed if there are other character rows with the same value of block identifier K as that of the character row, to which a target word of category assignment belongs (S2250). It is judged whether any of the above rules can be applied; and if they can be, the category of the target word is corrected.

The rule number n is set to 1 (S2252). It is judged whether the first rule should be applied (S2253). If so judged, the category of the target word is corrected according to the first rule (S2254); if, however, it is judged that the first rule should not be applied, control goes to step S2255. In step S2255, it is judged whether the rule number n is the last rule number. If not, the rule number n is incremented by 1 (S2256). The control then goes to step S2253 where it is judged whether the second rule should be applied. In this way, this category correction process is repeated until the rule number is judged as the last rule number in step S2255.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An apparatus for assigning categories to words in a document image, comprising:

a character row extracting means for extracting character row images from the document image;

a character extracting means for extracting character images for each character row image in units of a character image;

a character recognizing means for recognizing characters from the extracted character images and outputting recognition results;

a word detecting means for detecting words for each character row by using positions of the extracted character images and the character recognition results;

a keyword dictionary for prestoring categories to be assigned and groups of keyword character rows belonging to the categories;

a category correction rule dictionary for prestoring rules used for correcting a category of a word and assigning a category to a word in terms of relation between the word and other words in a same character row; and a category assigning means for comparing each character recognition result for each detected word with the groups of keyword character rows in the keyword dictionary, and, if a matching keyword character row is detected, assigning a category to which the keyword character row belongs to the word, then, referring to the category correction rule dictionary, and, if any applicable rule is detected, any of correcting the category assigned to the word and assigning a category to the word according to the applicable rule.

2. The apparatus of claim 1, wherein the category assigning means further comprises:

a joining means for joining two of more than one category-undefined word detected in a same character row after the keyword dictionary has been referred to, the keyword dictionary being referred to again for the joined words regarded as a new undefined word.

3. The apparatus of claim 1, wherein the category assigning means comprises:

a referring unit for referring to the keyword dictionary; and a category correcting unit for any of correcting and assigning a category by referring to the category correction rule dictionary; and wherein the referring unit comprises:

a selecting unit for selecting from the keyword dictionary keyword character rows with the same number of characters as the detected word, keyword character rows having less characters than the detected word, and keyword character rows having more characters than the detected word; and a comparing unit for comparing characters of the detected word with those of the selected keyword character rows, the comparing unit, if a number of characters of the detected word differ from that of the keyword character row, comparing the characters by masking a part of a larger one.

4. The apparatus of claim 3, wherein the category correcting unit comprises:

a numeral counting unit for counting numerals in one of an undefined word and more than one of consecutive undefined words in a same character row; and a numeral category assigning unit for assigning a category for numeral character rows to the word if the counted value of the numeral counting unit exceeds a certain value.

5. The apparatus of claim 1 further comprises:

a category-word dictionary for prestoring words to be referred to for each category; and a word correcting means for, after the category assignment and correction by the category assigning means have been completed, selecting a part of the category-word dictionary suitable for a category for each word, comparing the word with words in the part of the category-word dictionary, and replacing the recognition result of the word by a matched word detected in the category-word dictionary.

6. The apparatus of claim 5, wherein the category assigning means further comprises:

a joining means for joining two of more than one category-undefined word detected in a same character row after the keyword dictionary has been referred to, the keyword dictionary being referred to again for the joined words regarded as a new undefined word.

7. The apparatus of claim 6, wherein the category assigning means comprises:

a referring unit for referring to the keyword dictionary; and a category correcting unit for any of correcting and assigning a category by referring to the category correction rule dictionary; and wherein the referring unit comprises:

a selecting unit for selecting from the keyword dictionary keyword character rows with the same number of characters as the detected word, keyword character rows having less characters than the detected word, and keyword character rows having more characters than the detected word; and a comparing unit for comparing characters of the detected word with those of the selected keyword character rows, the comparing unit, if a number of characters of the detected word differ from that of the keyword character row, comparing the characters by masking a part of a larger one.

8. The apparatus of claim 7, wherein the category correcting unit comprises:

a numeral counting unit for counting numerals in one of an undefined word and more than one of consecutive undefined words in a same character row; and a numeral category assigning unit for assigning a category for numeral character rows to the word if the counted value of the numeral counting unit exceeds a certain value.

9. The apparatus of claim 5, wherein the category-word dictionary and the keyword dictionary share the same part.

10. An apparatus for assigning categories to words in a document image, comprising:

a character row extracting means for extracting character row images from the document image;

a block extracting means for extracting character rows in a range of certain distances as a block by comparing coordinates of each extracted character row;

a character extracting means for extracting character images for each character row image in units of a character image;

a character recognizing means for recognizing characters from the extracted character images and outputting recognition results;

a word detecting means for detecting words for each character row by using positions of the extracted character images and the character recognition results;

a keyword dictionary for prestoring categories to be assigned and groups of keyword character rows belonging to the categories;

a first category correction rule dictionary for prestoring rules used for any of correcting a category of a word and assigning a category to a word in terms of relation between the word and other words in a same character row;

a second category correction rule dictionary for prestoring rules of relation between categories of words in different character rows in a same block; and a category assigning means for comparing each character recognition result for each detected word with the groups of keyword character rows in the keyword dictionary, and, if a matching keyword character row is detected, assigning a category to which the keyword character row belongs to the word, then, referring to the first and second category correction rule dictionaries, and, if any applicable rule is detected, any of correcting the category assigned to the word and assigning a category to the word according to the applicable rule.

11. The apparatus of claim 10, wherein the category assigning means further comprises:

a joining means for joining two of more than one category-undefined word detected in a same character row after the keyword dictionary has been referred to, the keyword dictionary being referred to again for the joined words regarded as a new undefined word.

12. The apparatus of claim 10, wherein the category assigning means comprises:

a referring unit for referring to the keyword dictionary; and a category correcting unit for any of correcting and assigning a category by referring to the category correction rule dictionary; and wherein the referring unit comprises:

a selecting unit for selecting from the keyword dictionary keyword character rows with the same number of characters as the detected word, keyword character rows having less characters than the detected word, and keyword character rows having more characters than the detected word; and a comparing unit for comparing characters of the detected word with those of the selected keyword character rows, the comparing unit, if a number of characters of the detected word differ from that of the keyword character row, comparing the characters by masking a part of a larger one.

13. The apparatus of claim 12, wherein the category correcting unit comprises:
a numeral counting unit for counting numerals in one of an undefined word and more than one of consecutive undefined words in a same character row; and
a numeral category assigning unit for assigning a category for numeral character rows to the word if the counted value of the numeral counting unit exceeds a certain value.

14. The apparatus of claim 10 further comprises:
a category-word dictionary for prestoring words to be referred to for each category; and
a word correcting means for, after the category assignment and correction by the category assigning means have been completed, selecting a part of the category-word dictionary suitable for a category for each word, comparing the word with words in the part of the category-word dictionary, and replacing the recognition result of the word by a matched word detected in the category-word dictionary.

15. The apparatus of claim 14, wherein the category-word dictionary and the keyword dictionary share the same part.

16. A method for assigning categories to words in a document image, comprising:
a first step for extracting character row images from the document image;
a second step for extracting character images for each character row image in units of a character image;
a third step for recognizing characters from the extracted character images and outputting recognition results;
a fourth step for detecting words for each character row by using positions of the extracted character images and the character recognition results;
a fifth step for comparing a detected word with groups of keyword character rows in a keyword dictionary, and, if a matching keyword character row is detected, assigning a category to which a keyword character row belongs to the word, the keyword dictionary prestoring categories to be assigned and groups of keyword character rows belonging to the categories;
a sixth step for referring to a category correction rule dictionary, and, if any applicable rule is detected, correcting the category assigned to the word according to the applicable rule, the category correction rule dictionary prestoring rules used for correcting a category of a word and assigning a category to a word in terms of relation between the word and other words in a same character row; and
a seventh step for outputting recognition results of words and categories related to the words obtained from the previous steps.

17. The method of claim 16, wherein the fifth step further comprises:
a sub-step for detecting category-undefined words other than a category-undefined word in a same character row after the keyword dictionary has been referred to; and
a sub-step for, if detected, joining two words and referring to the keyword dictionary again for the joined words regarded as a new undefined word.

18. The method of claim 16, wherein the fifth step comprises:
a sub-step for selecting from the keyword dictionary keyword character rows with the same number of characters as the detected word, keyword character rows having less characters than the detected word, and keyword character rows having more characters than the detected word; and
a sub-step for comparing characters of the detected word with those of the selected keyword character rows in a comparing unit and, if a number of characters of the detected word differ from that of the keyword character row, comparing the characters by masking a part of a larger one.

19. The method of claim 18, wherein the sixth step comprises:
a sub-step for counting numerals in one of an undefined word and more than one of consecutive undefined words in a same character row; and
a sub-step for assigning a category for numeral character rows to the word if the counted value of a numeral counting unit exceeds a certain value.

20. The method of claim 16 further comprises:
a sub-step for, after the category assignment and correction by a category assigning means have been completed, selecting a part of a category-word dictionary suitable for a category for each word, comparing the word with words in the part of the category-word dictionary, and replacing the recognition result of the word by a matched word detected in the category-word dictionary, the category-word dictionary prestoring words to be referred to for each category.

21. The method of claim 20, wherein the fifth step further comprises:
a sub-step for detecting category-undefined words other than a category-undefined word in a same character row after the keyword dictionary has been referred to; and
a sub-step for, if detected, joining two words and referring to the keyword dictionary again for the joined words regarded as a new undefined word.

22. The method of claim 21, wherein the fifth step comprises:
a sub-step for selecting from the keyword dictionary keyword character rows with the same number of characters as the detected word, keyword character rows having less characters than the detected word, and keyword character rows having more characters than the detected word; and
a sub-step for comparing characters of the detected word with those of the selected keyword character rows in a comparing unit and, if a number of characters of the detected word differ from that of the keyword character row, comparing the characters by masking a part of a larger one.

23. The method of claim 22, wherein the sixth step comprises:
a sub-step for counting numerals in one of an undefined word and more than one of consecutive undefined words in a same character row; and
a sub-step for assigning a category for numeral character rows to the word if the counted value of a numeral counting unit exceeds a certain value.

24. A method for assigning categories to words in a document image, comprising:
a first step for extracting character row images from the document image;
a second step for extracting character rows in a range of certain distances as a block by comparing coordinates of each extracted character row;

a third step for extracting character images for each character row image in units of a character image;

a fourth step for recognizing characters from the extracted character images and outputting recognition results;

a fifth step for detecting words for each character row by using positions of the extracted character images and the character recognition results;

a sixth step for comparing a detected word with groups of keyword character rows in a keyword dictionary, and, if a matching keyword character row is detected, assigning a category to which the keyword character row belongs to the word, the keyword dictionary prestoring categories to be assigned and the groups of keyword character rows belonging to the categories;

a seventh step for referring to a first category correction rule dictionary and a second category correction rule dictionary, and, if any applicable rule is detected, any of correcting the category assigned to the word and assigning a category according to the applicable rule, the first category correction rule dictionary prestoring rules used for any of correcting a category of a word and assigning a category to a word in terms of relation between the word and other words in a same character row, and the second category correction rule dictionary prestoring rules of relation between categories of words in different character rows in a same block; and an eighth step for outputting recognition results of words and categories related to the words obtained from the previous steps.

25. The method of claim 24 further comprises:

a step for, after the category assignment and correction by a category assigning means have been completed, selecting a part of a category-word dictionary suitable for a category for each word, comparing the word with words in the part of the category-word dictionary, and replacing the recognition result of the word by a matched word detected in the category-word dictionary, the category-word dictionary prestoring words to be referred to for each category.

26. An apparatus for assigning categories to words in a document image, comprising:

a character row extracting means for extracting character row images from the document image;

a character extracting means for extracting character images for each character row image in units of a character image;

a character recognizing means for recognizing characters from the extracted character images and outputting recognition results;

a word detecting means for detecting words for each character row by using positions of the extracted character images and the character recognition results;

a keyword dictionary for prestoring categories to be assigned and groups of keyword character rows belonging to the categories;

category correction rule dictionary for prestoring rules used for correcting a category of a word and assigning a category to a word in terms of relation between the word and other words in a same character row; and a category assigning means for comparing each character recognition result for each detected word with the groups of keyword character rows in the keyword dictionary, and, if a matching keyword character row is detected, assigning a category to which the keyword character row belongs to the word, then, referring to the category correction rule dictionary, and, if any applicable rule is detected, any of correcting the category assigned to the word and assigning a category to the word according to the applicable rule including a numeral counting unit for counting the number of characters that are numerals and a telephone category assigning unit for assigning a category of telephone if three consecutive words in a same character row has not been assigned a category and the numeral counting unit determines that at least half of the characters in the character row are numerals.

* * * * *